(12) United States Patent
Bogard et al.

(10) Patent No.: US 10,233,844 B2
(45) Date of Patent: Mar. 19, 2019

(54) SYSTEM FOR THERMALLY SHIELDING A PORTION OF A GAS TURBINE SHROUD ASSEMBLY

(71) Applicant: GENERAL ELECTRIC COMPANY, Schenectady, NY (US)

(72) Inventors: Justin H. Bogard, Atlanta, GA (US); Jason David Shapiro, Methuen, MA (US)

(73) Assignee: General Electric Company, Schenectady, NY (US)

( * ) Notice: Subject to any disclaimer, the term of this patent is extended or adjusted under 35 U.S.C. 154(b) by 610 days.

(21) Appl. No.: 14/708,385

(22) Filed: May 11, 2015

(65) Prior Publication Data

US 2016/0333788 A1   Nov. 17, 2016

(51) Int. Cl.
*F02C 7/24* (2006.01)
*F01D 25/08* (2006.01)
(Continued)

(52) U.S. Cl.
CPC ............... *F02C 7/24* (2013.01); *F01D 5/08* (2013.01); *F01D 11/005* (2013.01); *F01D 11/08* (2013.01);
(Continued)

(58) Field of Classification Search
CPC ........ F01D 11/005; F01D 11/08; F01D 25/08; F01D 5/08; F02C 7/24; F05D 2240/11;
(Continued)

(56) References Cited

U.S. PATENT DOCUMENTS

| 4,087,199 A | * | 5/1978 | Hemsworth | ............ | F01D 11/08 |
| | | | | | 415/173.3 |
| 4,573,866 A | | 3/1986 | Sandy, Jr. et al. | | |

(Continued)

FOREIGN PATENT DOCUMENTS

CN   101315033 A   12/2008
EP    1566521 A1    8/2005
(Continued)

OTHER PUBLICATIONS

European Search Report and Opinion issued in connection with corresponding EP Application No. 16159096.3 dated Oct. 20, 2016.
(Continued)

*Primary Examiner* — Mary A Davis
(74) *Attorney, Agent, or Firm* — General Electric Company; Kristi Davidson

(57) ABSTRACT

In one aspect the present subject matter is directed to a system for thermally shielding a portion of a shroud assembly for a gas turbine. The system includes a shroud support having a forward wall that includes a front side that is axially spaced from a back side and a radially inner surface that extends axially between the front and back sides. A shroud is mounted to the shroud support. The shroud includes a leading edge portion that extends towards the forward wall of the shroud support and a trailing edge portion that extends towards the aft wall of the shroud support. A radial gap is defined between a top surface of the leading edge portion and the radially inner surface of the forward wall. A thermal shield is disposed along a bottom portion of the forward wall and is oriented to face towards a flow of combustion gases.

14 Claims, 4 Drawing Sheets

(51) Int. Cl.
    *F01D 11/08*     (2006.01)
    *F02C 3/04*     (2006.01)
    *F01D 11/00*     (2006.01)
    *F01D 5/08*     (2006.01)

(52) U.S. Cl.
    CPC .............. *F01D 25/08* (2013.01); *F02C 3/04* (2013.01); *F05D 2220/32* (2013.01); *F05D 2240/11* (2013.01); *F05D 2240/15* (2013.01); *F05D 2260/231* (2013.01); *F05D 2300/6033* (2013.01); *Y02T 50/672* (2013.01); *Y02T 50/676* (2013.01)

(58) Field of Classification Search
    CPC .......... F05D 2240/15; F05D 2260/231; F05D 2300/6033
    See application file for complete search history.

(56) References Cited

U.S. PATENT DOCUMENTS

| | | |
|---|---|---|
| 6,361,273 B1 | 3/2002 | Eng et al. |
| 6,758,653 B2 | 7/2004 | Morrison |
| 7,186,078 B2 * | 3/2007 | Tanaka ................. F01D 11/005 415/170.1 |
| 7,217,089 B2 | 5/2007 | Durocher |
| 2003/0165381 A1 | 9/2003 | Fokine et al. |
| 2005/0129499 A1 | 6/2005 | Morris et al. |
| 2005/0158168 A1 | 7/2005 | Bruce et al. |
| 2010/0150712 A1 | 6/2010 | Khanin et al. |
| 2012/0319362 A1 | 12/2012 | Tholen et al. |
| 2013/0156550 A1 | 6/2013 | Franks |
| 2016/0177786 A1 * | 6/2016 | Sippel .................... F01D 25/24 416/189 |

FOREIGN PATENT DOCUMENTS

| | | |
|---|---|---|
| EP | 2 075 437 A2 | 7/2009 |
| JP | H06-280615 A | 10/1994 |
| JP | H07-233735 A | 9/1995 |
| JP | 2013-164066 A | 8/2013 |
| WO | 2014168804 A1 | 10/2014 |

OTHER PUBLICATIONS

Notification of Reasons for Refusal issued in connection with corresponding JP Application No. 2016-042942 dated Feb. 7, 2017.
First Office Action and Search issued in connection with corresponding CN Application No. 201610138289.2 dated Apr. 28, 2017.
Office Action issued in connection with corresponding CA Application No. 2922517 dated Nov. 8, 2017.

* cited by examiner

SYSTEM FOR THERMALLY SHIELDING A PORTION OF A GAS TURBINE SHROUD ASSEMBLY

STATEMENT REGARDING FEDERALLY SPONSORED RESEARCH OR DEVELOPMENT

This invention was made with Government support under Contract No. W911W6-11-2-0009 awarded by the United States Army. The Government has certain rights in this invention.

FIELD OF THE INVENTION

The present subject matter relates generally to a turbine shroud for a gas turbine engine. More particularly, the present subject matter relates to a system for thermally shielding a portion of the turbine shroud assembly.

BACKGROUND OF THE INVENTION

A gas turbine engine generally includes, in serial flow order, a compressor section, a combustion section, a turbine section and an exhaust section. In operation, air enters an inlet of the compressor section where one or more axial compressors progressively compress the air until it reaches the combustion section. Fuel is mixed with the compressed air and burned within the combustion section to provide combustion gases. The combustion gases are routed from the combustion section through a hot gas path defined within the turbine section and then exhausted from the turbine section via the exhaust section.

In particular configurations, the turbine section includes, in serial flow order, a high pressure (HP) turbine and a low pressure (LP) turbine. The HP turbine and the LP turbine each include various rotatable turbine components such as turbine rotor disks and turbine rotor blades, and various stationary turbine components such as stator vanes or nozzles, turbine shrouds, shroud supports and engine frames. The rotatable and the stationary turbine components at least partially define the hot gas path through the turbine section. As the combustion gases flow through the hot gas path, thermal energy is transferred from the combustion gases to the rotatable turbine components and the stationary turbine components. As a result, it is generally necessary to cool the various rotatable and stationary turbine components to meet thermal and/or mechanical performance requirements.

Conventionally, a cooling medium such as compressed air is routed from the compressor section through various cooling passages or circuits defined within or around the various rotatable and stationary turbine components, thus providing cooling to those components. However, use of a 360 degree ceramic matrix composite shroud in the HPT allows for less backside shroud cooling via the compressed air due to the favorable thermal properties of the ceramic matrix composite material. As a result, the amount of compressed air normally routed into or around the shroud assembly is reduced, thus enhancing overall engine performance and/or efficiency.

The reduction in cooling flow to the shroud assembly may result in higher temperatures on stationary hardware such as the shroud support hardware of the shroud assembly that is potentially exposed to or in the line of sight of the combustion gases flowing through the hot gas path. Increased thermal stresses on the shroud support hardware generally occurs when the shroud support hardware is formed from metal or other materials having less favorable thermal properties for exposure to the combustion gases than the ceramic matrix composite material used for the shroud. Accordingly, a turbine shroud assembly configured to thermally shield the shroud support and/or other adjacent stationary hardware to reduce thermal stresses would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for thermally shielding a portion of a shroud assembly for a gas turbine. The system includes a shroud support having a forward wall that is axially spaced from an aft wall. The forward wall has a front side that is axially spaced from a back side, and a radially inner surface that extends axially between the front and back sides. A shroud is mounted to the shroud support. The shroud has a leading edge portion that extends towards the forward wall of the shroud support and a trailing edge portion that extends towards the aft wall of the shroud support. A radial gap is defined between a top surface of the leading edge portion and the radially inner surface of the forward wall. A thermal shield is disposed along a bottom portion of the forward wall and is oriented to face towards a flow of combustion gases.

Another aspect of the present subject matter is directed to a system for thermally shielding a portion of a shroud assembly for a gas turbine. The system includes a shroud support having a forward wall that is axially spaced from an aft wall. The forward wall has a front side that is axially spaced from a back side, and a radially inner surface that extends axially between the front and back sides. A shroud is mounted to the shroud support and includes a leading edge portion that extends towards the forward wall of the shroud support and a trailing edge portion that extends towards the aft wall of the shroud support. A radial gap is defined between a top surface of the leading edge portion and the radially inner surface of the forward wall. The leading edge portion terminates axially forward from the front side of the forward wall such that the leading edge portion thermally shields the front wall.

In another aspect of the present subject matter is directed to a gas turbine. The gas turbine includes a compressor, a combustor disposed downstream from the compressor and a turbine disposed downstream from the combustor. The turbine comprises a turbine shroud assembly that extends circumferentially about a row of turbine rotor blades. The turbine further includes a system for thermally shielding a portion the turbine shroud assembly. The system includes a shroud seal support having a forward wall that is axially spaced from an aft wall. The forward wall includes a front side that is axially spaced from a back side and a radially inner surface that extends axially between the front and back sides. A shroud seal is mounted to the shroud seal support. The shroud seal includes a leading edge portion that extends towards the forward wall of the shroud seal support and a trailing edge portion that extends towards the aft wall of the shroud seal support. A radial gap is defined between a top surface of the leading edge portion and the radially inner surface of the forward wall. The leading edge portion terminates axially forward from the front side of the forward wall so as to thermally shield the front wall from combustion gases within the turbine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
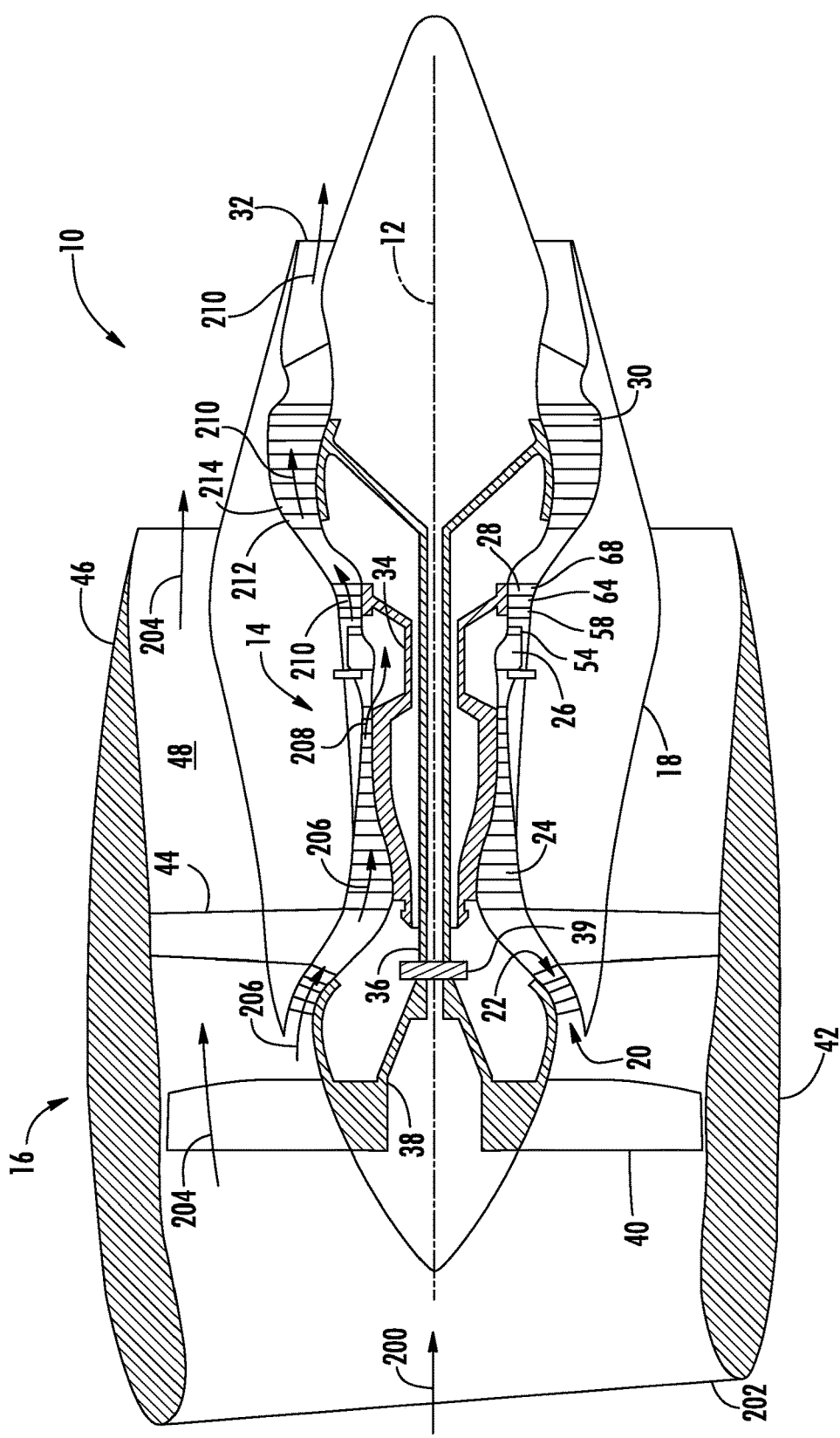
FIG. 1 is a schematic cross-sectional view of an exemplary high bypass turbofan jet engine as may incorporate various embodiments of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Referring now to the drawings, wherein identical numerals indicate the same elements throughout the figures, FIG. 1 is a schematic cross-sectional view of an exemplary high bypass turbofan type gas turbine engine 10 herein referred to as "turbofan 10" as may incorporate various embodiments of the present invention. As shown in FIG. 1, the turbofan 10 has a longitudinal or axial centerline axis 12 that extends therethrough for reference purposes. In general, the turbofan 10 may include a core turbine or gas turbine engine 14 this disposed downstream from a fan section 16.

The gas turbine engine 14 may generally include a substantially tubular outer casing 18 that defines an annular inlet 20. The outer casing 18 may be formed from multiple casings. The outer casing 18 encases, in serial flow relationship, a compressor section having a booster or low pressure (LP) compressor 22, a high pressure (HP) compressor 24, a combustion section 26, a turbine section including a high pressure (HP) turbine 28, a low pressure (LP) turbine 30, and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The (LP) spool 36 may also be connected to a fan spool or shaft 38 of the fan section 16. In particular embodiments, as shown in FIG. 1, the (LP) spool 36 may be connected directly to the fan spool 38 such as in a direct-drive configuration. In alternative configurations, the (LP) spool 36 may be connected to the fan spool 38 via a reduction gear 39 such as in an indirect-drive or geared-drive configuration.

As shown in FIG. 1, the fan section 16 includes a plurality of fan blades 40 that are coupled to and that extend radially outwardly from the fan spool 38. An annular fan casing or nacelle 42 circumferentially surrounds the fan section 16 and/or at least a portion of the gas turbine engine 14. It should be appreciated by those of ordinary skill in the art that the nacelle 42 may be configured to be supported relative to the gas turbine engine 14 by a plurality of circumferentially-spaced outlet guide vanes 44. Moreover, a downstream section 46 of the nacelle 42 may extend over an outer portion of the gas turbine engine 14 so as to define a bypass airflow passage 48 therebetween.

Figure 2:
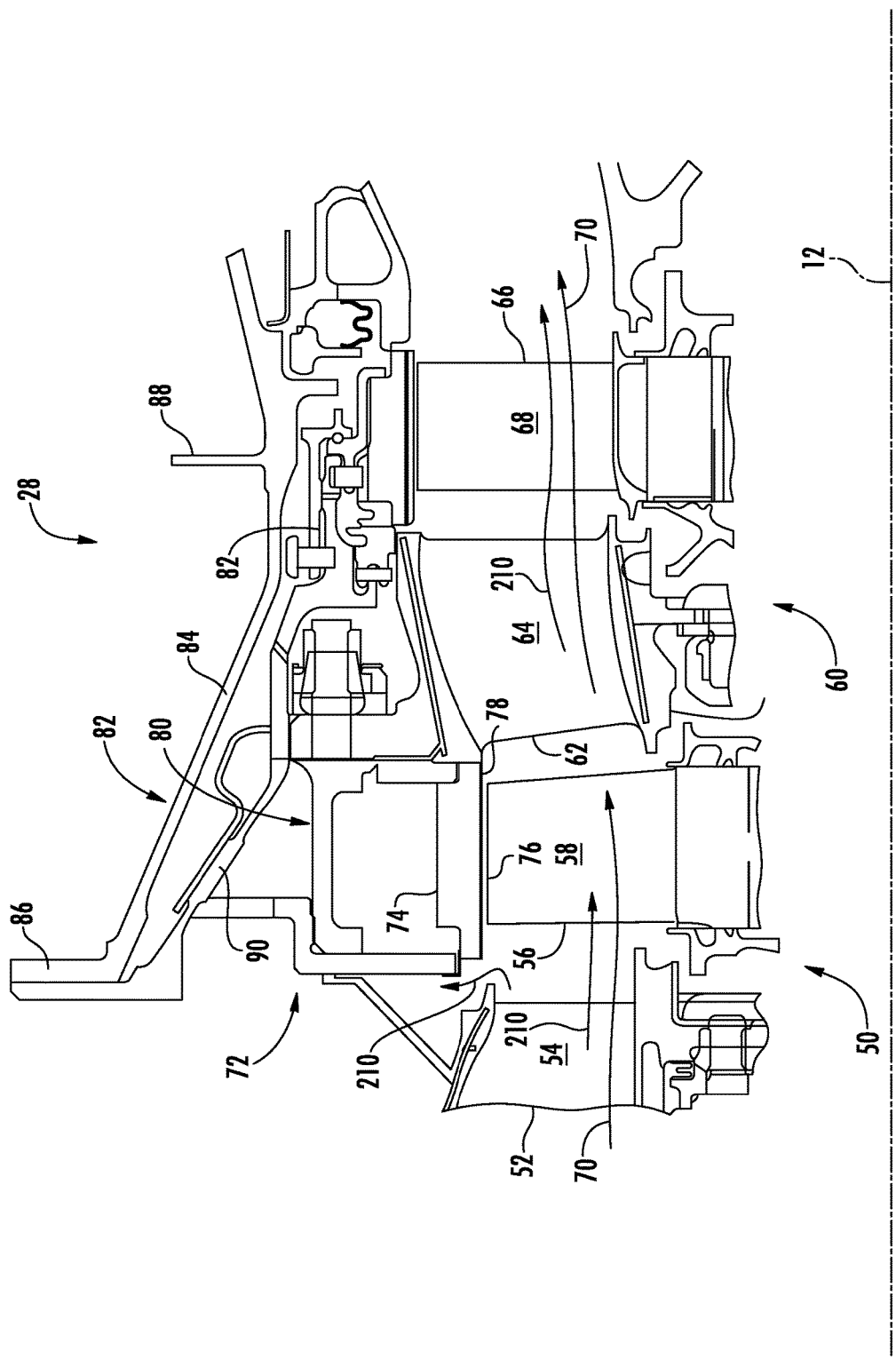
FIG. 2 is an enlarged cross sectional side view of a high pressure turbine portion of the gas turbine engine as shown in FIG. 1, as may incorporate various embodiments of the present invention.

FIG. 2 provides an enlarged cross sectioned view of the HP turbine 28 portion of the gas turbine engine 14 as shown in FIG. 1, as may incorporate various embodiments of the present invention. As shown in FIG. 2, the HP turbine 28 includes, in serial flow relationship, a first stage 50 which includes a row 52 of stator vanes 54 (only one shown) axially spaced from a row 56 of turbine rotor blades 58 (only one shown). The HP turbine 28 further includes a second stage 60 which includes a row 62 of stator vanes 64 (only one shown) axially spaced from a row 66 of turbine rotor blades 68 (only one shown).

The turbine rotor blades 58, 68 extend radially outwardly from and are coupled to the HP spool 34 (FIG. 1). As shown in FIG. 2, the stator vanes 54, 64 and the turbine rotor blades 58, 68 at least partially define a hot gas path 70 for routing combustion gases from the combustion section 26 (FIG. 1) through the HP turbine 28. As shown in FIG. 1, the rows 52, 62 of the stator vanes 54, 64 are annularly arranged about the HP spool 34 and the rows 56, 66 of the turbine rotor blades 58, 68 are circumferentially spaced around the HP spool 34.

In various embodiments, as shown in FIG. 2, the HP turbine 28 includes a turbine shroud or shroud seal assembly 72 that forms an annular ring around the row 56 of turbine rotor blades 58 of the first stage 50 with respect to the centerline 12. Although the shroud seal assembly 72 will be described and illustrated surrounding the turbine rotor blades 58 of the first stage 50, the shroud seal assembly 72 as provided herein may be configured to surround any row of turbine rotor blades of the HP turbine 28 or the LP turbine 30 and the invention provided herein is not limited to the first stage 50 of the HP turbine 28 unless specifically stated in the claims.

The shroud seal assembly 72 includes a shroud seal 74. The shroud seal 74 is radially spaced from a blade tip 76 of each of the turbine rotor blades 58. A clearance gap is defined between the blade tips 76 and a sealing surface or side 78 of the shroud seal 74. It is generally desirable to minimize the clearance gap between the blade tips 76 and the shroud seals 74, particularly during cruise operation of the turbofan 10 to reduce leakage from the hot gas path 70 through the clearance gap. In particular embodiments, the shroud seal 74 is formed as a continuous, unitary or seamless ring made of a ceramic material and, more particularly, a ceramic matrix composite (CMC) material.

In various embodiments, the shroud seal assembly 72 further includes a shroud seal support or retaining ring 80. In particular embodiments, the shroud seal support 80 is connected to a static structure such as a backbone 82 of the gas turbine engine 14. The backbone 82 is an engine frame that provides structural support for various static components that are positioned radially inwardly from the backbone 82. The backbone 82 also couples the outer casing 18 around the gas turbine engine 14. The backbone 82 facilitates controlling engine clearance closures defined between the outer casing 18 and components positioned radially inwardly from the backbone 82. The backbone 82 is typically designed to be rigid or stiff. In various embodiments, as shown in FIG. 2, a HP turbine casing 84 having substantially circular and parallel upstream and downstream flanges 86, 88, is bolted to a combustor casing (not shown) of the combustion section 26 (FIG. 1). A turbine shroud support ring 90 may be provided to mount the shroud seal support 80.

During operation of the turbofan 10, as illustrated in FIG. 1, air 200 enters an inlet portion 202 of the turbofan 10. A first portion of the air 200 as indicated by arrow 204 is directed into the bypass flow passage 48 and a second portion of the air 200 as indicated by arrow 206 enters the inlet 20 of the LP compressor 22. The second portion of air 206 is progressively compressed as it is routed from the LP compressor 22 into the HP compressor 24. The second portion of the air 206 is further compressed as it is routed through the HP compressor 24, thus providing compressed air as indicated by arrow 208 to the combustion section 26 where it is mixed with fuel and burned to provide combustion gases as indicated by arrow 210.

The combustion gases 210 are routed through the HP turbine 28 where a portion of thermal and/or kinetic energy from the combustion gases 210 is extracted via the stator vanes 54, 64 and turbine rotor blades 58, 68 of the first and second stages 50, 60 respectively, thus causing the HP shaft or spool 34 to rotate, thereby supporting operation of the HP compressor 24. The combustion gases 210 are then routed through the LP turbine 30 where a second portion of thermal and kinetic energy is extracted from the combustion gases 210 via sequential stages of LP turbine stator vanes 212 and LP turbine rotor blades 214 that are coupled to the LP shaft or spool 36, thus causing the LP shaft or spool 36 to rotate, thereby supporting operation of the LP compressor 22 and/or rotation of the fan spool or shaft 38. The combustion gases 210 are then routed through the jet exhaust nozzle section 32 of the gas turbine engine 14.

The temperature of the combustion gases 210 flowing through the HP and LP turbine sections 28, 30, particularly through the HP turbine 28, may be extreme. For example, the combustion gases 114 flowing through a portion of the hot gas path 70 defined by/within the HP turbine 28 may exceed 2000 degrees Fahrenheit. As a result, it is necessary and/or beneficial to cool the various turbine hardware components of the HP turbine 28 and/or the LP turbine 30 such as but not limited to the shroud seal assembly 72 via cooling air routed from the compressor 22, 24 to meet thermal and/or mechanical performance requirements.

Use of ceramic, particularly ceramic matrix composite materials to form the shroud seal 74 reduces the amount of cooling air that is normally required to cool the shroud seals 74. Although reduction in cooling flow to cool the shroud seals 74 may enhance overall engine efficiency, the reduction in cooling air flow may have adverse effects on portions of the shroud seal assembly 72 such as the shroud seal support 80 or surrounding stationary hardware that are formed from other materials such as metal alloys that have less favorable thermal properties for use at such elevated temperatures. This may particularly true for hardware such as the shroud seal support 80 that may be potentially exposed or in the line of sight to the combustion gases 210 flowing through the HP turbine 28 and the LP turbine 30.

Figure 3:
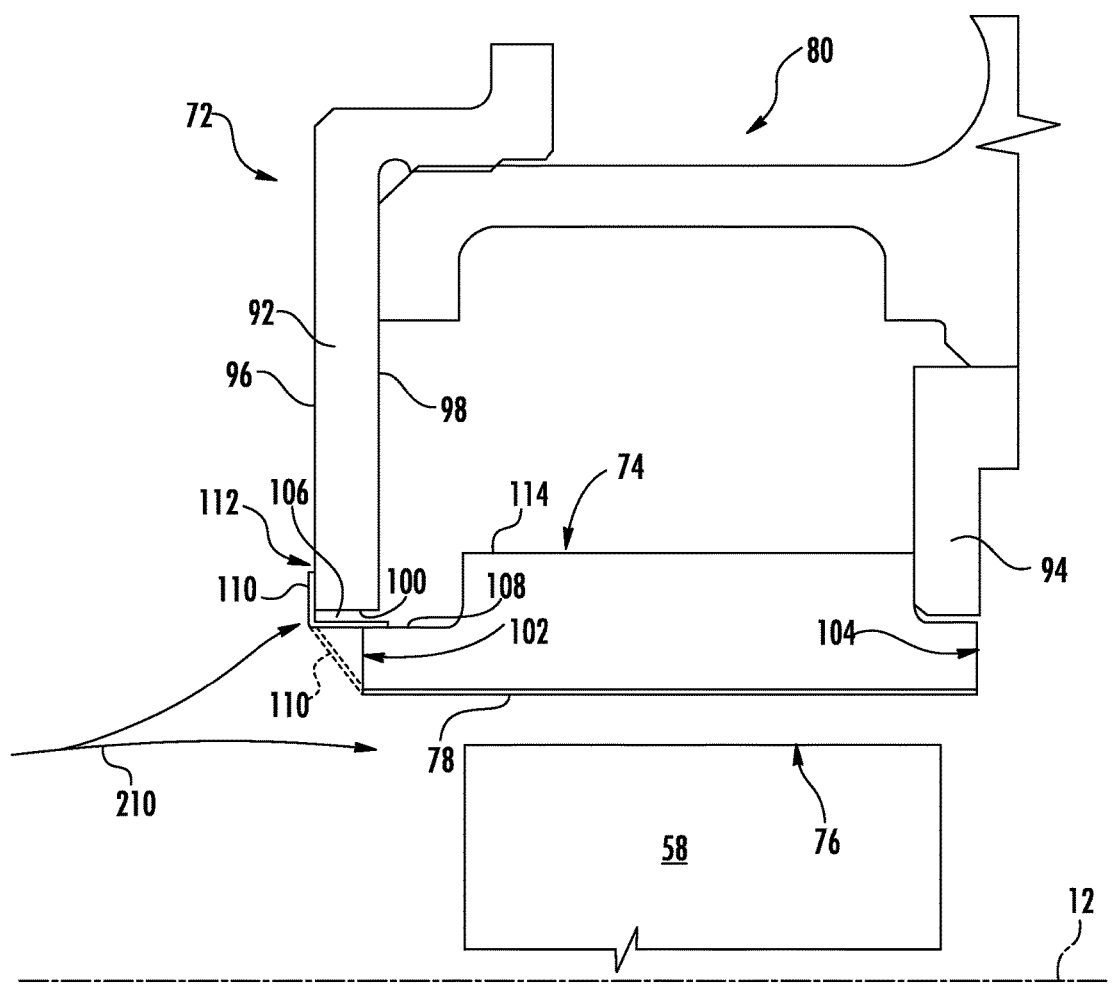
FIG. 3 is an enlarged side view of a portion of the high pressure turbine as shown in FIG. 2, according to various embodiments of the present invention.

FIG. 3 provides an enlarged side view that includes a portion of a turbine rotor blade 58 and the shroud seal assembly 72 according to various embodiments of the present invention. As shown in FIG. 3, the shroud seal support 80 includes a forward wall or retaining member 92 axially spaced from an aft wall or retaining member 94. In particular embodiments, the forward wall 92 and/or the aft wall 96 of the shroud seal support 82 are formed from a non-ceramic matrix composite material such as a metal alloy or sheet metal. The forward wall 92 includes a front side 96 that is axially spaced from a back side 98 with respect to centerline 12 and a radially inner surface 100 that extends axially between the front and back sides 96, 98 with respect to centerline 12.

The shroud seal 74 is mounted or coupled to the shroud seal support 80. The shroud seal 74 includes a leading edge portion 104 that extends towards the forward wall 92 of the shroud seal support 80 and a trailing edge portion 104 that extends towards the aft wall 94 of the shroud seal support 80. In one embodiment, the leading edge portion 104 of the shroud seal 74 terminates axially between the front side 96 and the back side 98 of the forward wall 92. A radial gap 106 is defined between a top surface 108 of the leading edge portion 102 and the radially inner surface 100 of the forward wall.

In one embodiment, a system for thermally shielding a portion of the shroud assembly 72 includes a thermal shield 110 that is disposed along a bottom portion 112 of the forward wall 92. The thermal shield 110 may be formed from a ceramic matrix composite material or any material having suitable thermal properties for reducing thermal stresses on the shroud seal support 80 and/or other stationary hardware proximate to the shroud seal assembly 72. The thermal shield 110 is generally oriented to face towards or into a flow of the combustion gases 210.

In one embodiment, the thermal shield 110 extends from the front side 96 of the forward wall 92 to the top surface 108 of the shroud seal 74. In one embodiment, the thermal shield 110 is fixedly connected to at least one of the front side 96 of the forward wall 92 and to the top surface 108 of the shroud seal 74. In one embodiment, the thermal shield 110 is fixedly connected to the forward wall 92, but is free to move at an interface between the thermal seal 110 and the top surface 108 of the shroud seal 74, thereby allowing cooling flow to leak or pass through the radial gap. In particular embodiments, the thermal shield 110 at least partially seals the radial gap 106, thus preventing or restricting leakage of the combustion gases 210 onto a backside 114 of the shroud seal 74.

In one embodiment, the thermal shield 110, as shown in dashed lines, extends from the bottom portion 112 of the forward wall 92 towards the leading edge portion 102 of the shroud seal 74. In one embodiment, the thermal shield 110 extends from the front side 96 of the forward wall 92 towards the sealing surface 78 of the shroud seal. In particular embodiment, the shroud seal 74 is formed from a ceramic matrix composite as a continuous, unitary or seamless 360 degree ring.

Figure 4:
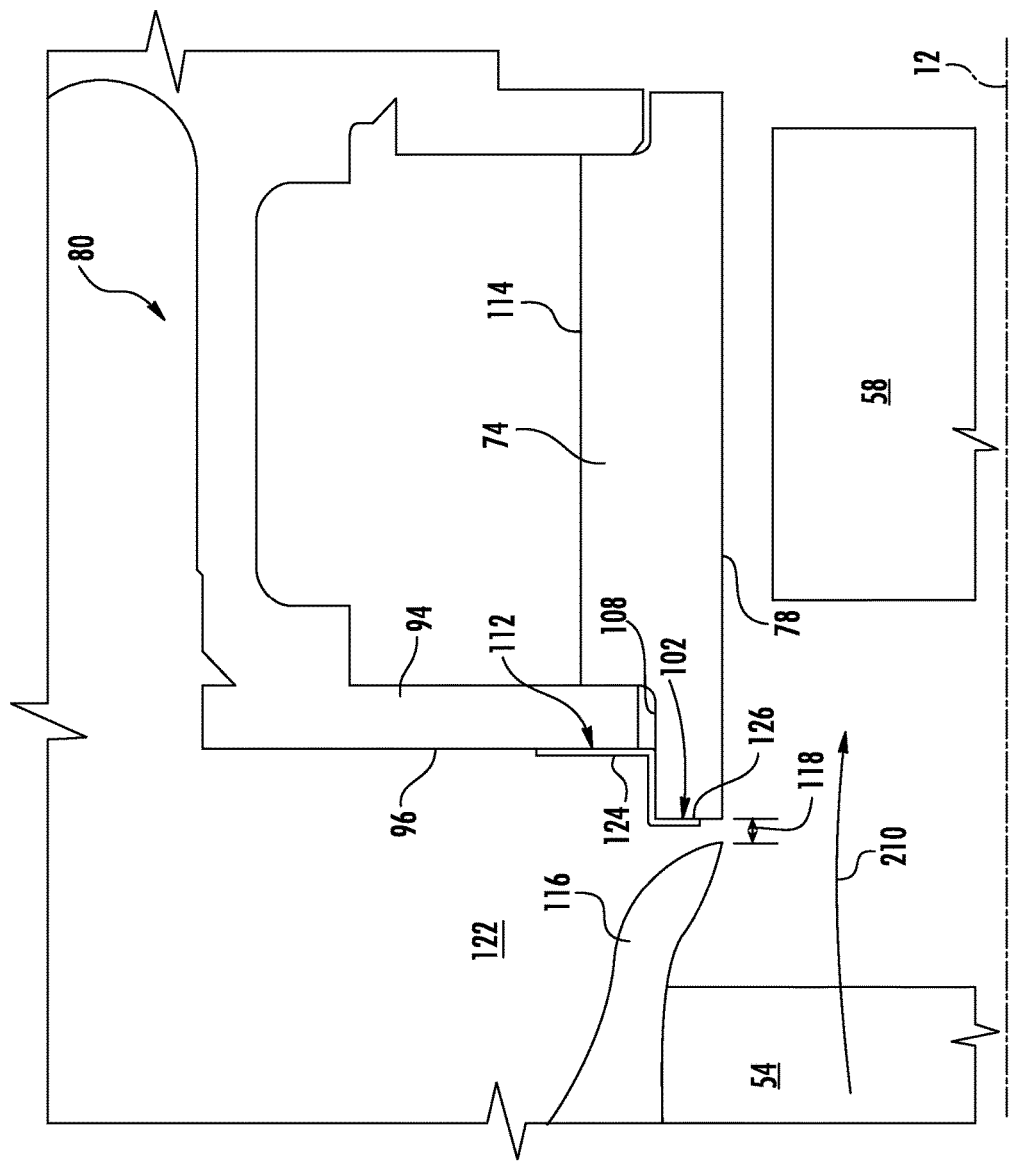
FIG. 4 is an enlarged side view of a portion of the high pressure turbine as shown in FIG. 2, according to various embodiments of the present invention.

FIG. 4 provides an enlarged side view that includes a portion of a turbine rotor blade 58, a portion of the stator vane 54 of the first row 52, a portion of the stator vane 64 of the second row 62 and the shroud seal assembly 72 according to various embodiments of the present invention. In on embodiment, as shown in FIG. 4, the leading edge portion 102 of the shroud seal 74 terminates axially forward from the front side 96 of the forward wall 92 with respect to axial centerline 12. In this manner, the leading edge portion 102 at least partially defines a system for thermally shielding the forward wall 92 and/or other stationary hardware disposed adjacent to the forward wall 92 from exposure to the combustion gases 210. The leading edge portion 102 may extend towards an outer band 116 portion of the stationary vane 54 so as to minimize an axial gap 118 defined between an aft portion 120 of the outer band portion 116 and the leading edge portion 102 of the shroud seal 74 so as to minimize or control leakage of the combustion gases 210 from the hot gap path 70 into a stagnant space or volume 122 defined radially outwardly from the outer band 116 and/or the shroud seal 74.

In one embodiment, the shroud seal 74 is formed from a ceramic matrix composite material and the shroud seal support 80 is formed from a non-ceramic matrix composite material such as sheet metal formed from a metal alloy. In one embodiment, the shroud seal 74 is formed from a ceramic matrix composite as a continuous, unitary or seamless 360 degree ring.

In particular embodiments, a thermal shield 124 is disposed along the bottom portion 112 of the front side 96 of the forward wall 92 and is oriented to face towards the flow of the combustion gases 210 and/or towards the stagnant volume 122. The thermal shield 124 may be formed from a ceramic matrix composite material or other material such as a metal alloy having suitable thermal properties for the intended purpose of reducing thermal stresses on the non-ceramic or non-ceramic matrix composite materials of the shroud seal assembly 72.

In one embodiment, the thermal shield 124 is connected to the front side 96 of the forward wall 92 and to the top surface 108 of the shroud seal 74. In on embodiment, the thermal shield 124 extends from the bottom portion 112 of the front wall towards the leading edge portion 102 of the shroud seal 74. In particular embodiments, the thermal shield 124 at least partially seals the radial gap 106 defined between the radially inner surface 100 of the forward wall 92 and the top surface 108 of the shroud seal 74. In one embodiment, the thermal shield 124 extends from the front side 96 of the forward wall 92 along a forward surface 126 of the shroud seal 74 and towards the sealing surface 78 of the shroud seal 74.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for thermally shielding a portion of a gas turbine shroud assembly, comprising:
    a shroud seal support having a forward wall axially spaced from an aft wall, the forward wall exposed to combustion gases and having a front side axially spaced from a back side and a radially inner surface that extends axially between the front and back sides;
    a shroud seal mounted to the shroud seal support, the shroud seal having a leading edge portion that extends towards the forward wall of the shroud seal support and a trailing edge portion that extends towards the aft wall of the shroud seal support, wherein a radial gap is defined between a top surface of the leading edge portion and the radially inner surface of the forward wall; and
    a thermal shield extended from a bottom portion of the front side of the forward wall to a top surface of the shroud seal, wherein the thermal shield is oriented to face towards a flow of combustion gases.

2. The system as in claim 1, wherein the thermal shield extends from the bottom portion of the front wall towards the leading edge portion of the shroud seal.

3. The system as in claim 1, wherein the thermal shield at least partially seals the radial gap.

4. The system as in claim 1, wherein the shroud seal is formed from a ceramic matrix composite material and the shroud seal support is formed from a non-ceramic matrix composite material.

5. The system as in claim 1, wherein the thermal shield is formed from a ceramic matrix composite material.

6. The system as in claim 1, wherein the shroud seal is formed from a ceramic matrix composite as a continuous ring.

7. The system as in claim 1, wherein the leading edge portion of the shroud seal terminates axially between the front side and the back side of the forward wall.

8. A system for thermally shielding a portion of a gas turbine shroud assembly, comprising:
    a shroud seal support having a forward wall axially spaced from an aft wall, the forward wall exposed to combustion gases and having a front side axially spaced from a back side and a radially inner surface that extends axially between the front and back sides;
    a shroud seal mounted to the shroud seal support, the shroud seal having a leading edge portion that extends towards the forward wall of the shroud seal support and a trailing edge portion that extends towards the aft wall of the shroud seal support, wherein a radial gap is defined between a top surface of the leading edge portion and the radially inner surface of the forward wall; and
    a thermal shield extended from a bottom portion of the front side of the forward wall to a top surface of the shroud seal, wherein the thermal shield is oriented to face towards a flow of combustion gases;
    wherein the leading edge portion terminates axially forward from the front side of the forward wall, wherein the leading edge portion thermally shields the front wall.

9. The system as in claim 8, wherein the shroud seal is formed from a ceramic matrix composite material and the shroud seal support is formed from a non-ceramic matrix composite material.

10. The system as in claim 8, wherein the shroud seal is formed from a ceramic matrix composite as a continuous ring.

11. The system as in claim 8, wherein the thermal shield extends from the bottom portion of the front wall to the leading edge portion of the shroud seal.

12. The system as in claim 8, wherein the thermal shield at least partially seals the radial gap.

13. The system as in claim 8, wherein the thermal shield is formed from a ceramic matrix composite material.

14. A gas turbine, comprising:
    a compressor;

a combustor disposed downstream from the compressor; and a turbine disposed downstream from the combustor, wherein the turbine comprises a turbine shroud assembly that extends circumferentially about a row of turbine rotor blades, turbine further including a system for thermally shielding a portion the turbine shroud assembly, the system comprising:

a shroud seal support having a forward wall axially spaced from an aft wall, the forward wall exposed to combustion gases and having a front side axially spaced from a back side and a radially inner surface that extends axially between the front and back sides;

a shroud seal mounted to the shroud seal support, the shroud seal having a leading edge portion that extends towards the forward wall of the shroud seal support and a trailing edge portion that extends towards the aft wall of the shroud seal support, wherein a radial gap is defined between a top surface of the leading edge portion and the radially inner surface of the forward wall; and a thermal shield extended from a bottom portion of the front side of the forward wall to a top surface of the shroud seal, wherein the thermal shield is oriented to face towards a flow of combustion gases;

wherein the leading edge portion terminates axially forward from the front side of the forward wall, wherein the leading edge portion thermally shields the front wall.

\* \* \* \* \*